(12) United States Patent
Chen et al.

(10) Patent No.: US 12,491,592 B2
(45) Date of Patent: Dec. 9, 2025

(54) LINKAGE SWING HEAD STRUCTURE

(71) Applicant: KEDE NUMERICAL CONTROL CO., LTD., Liaoning (CN)

(72) Inventors: Hu Chen, Liaoning (CN); Xin Deng, Liaoning (CN); Hongtao Tang, Liaoning (CN); Haibo Zhang, Liaoning (CN); Yapeng Li, Liaoning (CN); Cuijuan Guo, Liaoning (CN); Changlin Du, Liaoning (CN); Zhihong Wei, Liaoning (CN); Hongwei Sun, Liaoning (CN); Guoshuai Zhang, Liaoning (CN); Xiangyuan Kong, Liaoning (CN); Gang Xu, Liaoning (CN); Dawei Wang, Liaoning (CN); Dapeng Dong, Liaoning (CN); Meng Lin, Liaoning (CN); Pei Liu, Liaoning (CN); Yanqing Bai, Liaoning (CN); Feng Wang, Liaoning (CN); Yinghua Li, Liaoning (CN); Shaoyi Liu, Liaoning (CN); Zidan Ju, Liaoning (CN)

(73) Assignee: KEDE NUMERICAL CONTROL CO., LTD., Liaoning (CN)

( * ) Notice: Subject to any disclaimer, the term of this patent is extended or adjusted under 35 U.S.C. 154(b) by 806 days.

(21) Appl. No.: 17/788,616

(22) PCT Filed: Nov. 27, 2020

(86) PCT No.: PCT/CN2020/132122
§ 371 (c)(1),
(2) Date: Jun. 23, 2022

(87) PCT Pub. No.: WO2021/135760
PCT Pub. Date: Jul. 8, 2021

(65) Prior Publication Data
US 2023/0035467 A1 Feb. 2, 2023

(30) Foreign Application Priority Data

Dec. 31, 2019 (CN) .......................... 201911419367.6

(51) Int. Cl.
*B23Q 1/70* (2006.01)
*B23C 9/00* (2006.01)
(Continued)

(52) U.S. Cl.
CPC .............. *B23Q 1/706* (2013.01); *B23C 9/005* (2013.01); *B23Q 5/10* (2013.01); *B23Q 5/36* (2013.01);
(Continued)

(58) Field of Classification Search
CPC . B23Q 1/52; B23Q 1/70; B23Q 1/706; B23Q 5/043; B23Q 5/36; B23Q 5/42;
(Continued)

(56) References Cited

U.S. PATENT DOCUMENTS 5,584,621 A * 12/1996 Bertsche .............. B23Q 1/5406
901/24
8,082,642 B1 * 12/2011 McCulloch ............... B23C 1/12
409/211
(Continued)

FOREIGN PATENT DOCUMENTS

CN 101011797 A * 8/2007
CN 102019636 B * 11/2012
(Continued)

*Primary Examiner* — Sunil K Singh
*Assistant Examiner* — Michael Vitale
(74) *Attorney, Agent, or Firm* — MUNCY, GEISSLER, OLDS & LOWE, P.C.

(57) ABSTRACT

The present invention provides a linkage swing head structure, including: a base, a drive mechanism and a spindle. The drive mechanism includes: a power mechanism, a connecting rod mechanism and a lead screw. An end of the spindle is fixed with a cutter, and the spindle is fixed on an end of
(Continued)

the connecting rod mechanism. An end of the connecting rod mechanism fixed with the spindle is sleeved on a support bearing, the connecting rod mechanism can rotate around the support bearing, the support bearing is fixed on the base, and the other end of the connecting rod mechanism is movably connected to the lead screw. An output end of the power mechanism is connected to an end of the lead screw. The connecting rod mechanism adjusts the rotation angle of the spindle by sliding on the lead screw. The drive mechanism of the present invention is far away from the spindle, and the interference range thereof to the spindle is small. The spindle can be automatically and continuously indexed, and can also perform linkage machining with small cutting amount, and thus, when the cutter rotates by the same angle, the volume of the device is reduced; the structure is simple and the manufacturing cost is low.

7 Claims, 4 Drawing Sheets

(51) Int. Cl.
*B23Q 5/10* (2006.01)
*B23Q 5/36* (2006.01)
(52) U.S. Cl.
CPC ............... *Y10T 409/307672* (2015.01); *Y10T 409/308512* (2015.01)

(58) Field of Classification Search
CPC . B23Q 2220/006; B23C 9/005; Y10T 408/93; Y10T 408/935; Y10T 409/307672; Y10T 409/308232; Y10T 409/308512
USPC .................. 409/201, 211, 216; 408/236, 237
See application file for complete search history.

(56) References Cited

U.S. PATENT DOCUMENTS

| | | | |
|---|---|---|---|
| 9,903,442 B2* | 2/2018 | Mizuhashi | ................ F16H 1/32 |
| 2001/0046422 A1* | 11/2001 | Colombo | ............... B23Q 5/045 |
| | | | 409/211 |
| 2005/0031428 A1* | 2/2005 | Bo | ........................... B23Q 5/34 |
| | | | 409/201 |
| 2010/0206599 A1* | 8/2010 | Sugiyama | ............ B23Q 16/025 |
| | | | 409/201 |
| 2012/0121356 A1* | 5/2012 | Tatsuda | ................ B23Q 1/0018 |
| | | | 409/201 |

FOREIGN PATENT DOCUMENTS

| | | | | | |
|---|---|---|---|---|---|
| CN | | 203109692 U | * | 8/2013 | |
| CN | | 205703290 U | * | 11/2016 | |
| CN | | 110470467 A | * | 11/2019 | |
| EP | | 2030721 A1 | * | 3/2009 | ............... B23Q 1/44 |

* cited by examiner

LINKAGE SWING HEAD STRUCTURE

TECHNICAL FIELD

The present invention relates to the field of machine tool processing, particularly, to a linkage swing head structure.

BACKGROUND ART

In the case of deep cavity machining of parts in the aviation field such as casings and housings, at present, the common machining milling heads are generally fixed-angle and lengthened milling heads. Most of such milling heads require a manual control of the angle and length of milling head to realize the machining of parts. None of the above methods can realize the continuous indexing machining of parts, resulting in low machining efficiency.

SUMMARY OF INVENTION

The present invention provides a linkage swing head structure to overcome the above technical problems.

The present invention provides a linkage swing head structure, including: a base; a drive mechanism; and a spindle 3 with a cutter fixed at an end.

The drive mechanism includes: a power mechanism, a connecting rod mechanism and a lead screw.

The connecting rod mechanism includes: a first connecting rod, a second connecting rod and a nut seat.

The nut seat is sleeved on the lead screw. An end of the first connecting rod is fixedly connected to a side wall of the nut seat via a pin, the other end of the first connecting rod is movably connected to an end of the second connecting rod via the pin, and the other end of the second connecting rod is fixed on a side wall of the spindle and is rotatably connected to a support bearing fixed in the base.

An end of the power mechanism is fixed on an inner wall of the base, and an output end of the power mechanism is connected to an end of the lead screw.

Further, the power mechanism includes a servo motor, a driving wheel, a driven wheel and a synchronous belt.

An output end of the servo motor is connected to the driving wheel and the driving wheel is connected to the driven wheel via the synchronous belt. The driven wheel is movably connected to an end of the lead screw.

Further, the included angle $\beta$ between the central axis of the spindle and the central axis of the second connecting rod ranges from 0° to 180°; the rotation angle $\alpha$ of the spindle ranges from 0° to 120°; and when $\alpha$ is 0°, the included angle between the central axis of the spindle and the x-axis is $\theta$, and when $\alpha$ is 120°, the included angle between the central axis of the spindle and the y-axis is $\gamma$, and the sum of $\theta$ and $\gamma$ is 30°.

Further, the lead screw is provided with an anti-dropping piece at an end outside the driving wheel and at an end outside the nut seat.

Further, the linkage swing head structure includes a linear measurement unit and an angle measurement unit.

The linear measurement unit is fixed on the nut seat, and the angle measurement unit is fixed on a side wall at an end portion of the support bearing.

Further, an opening for rotating the spindle 3 is provided on a side wall of the base parallel to a rotation axis of the spindle.

Further, the drive mechanism consists of at least one group respectively arranged on both side walls of the spindle.

The drive mechanism of the present invention is far away from the spindle, and the interference range thereof to the spindle is small. The spindle can be automatically and continuously indexed, and can also perform linkage machining with small cutting amount, and thus, when the cutter rotates by the same angle, the volume of the device is reduced; the structure is simple and the manufacturing cost is low.

BRIEF DESCRIPTION OF DRAWINGS

In order to illustrate the embodiments of the present invention or the technical solutions in the prior art more clearly, the following briefly introduces the accompanying drawings that need to be used in the description of the embodiments or the prior art. Obviously, the accompanying drawings in the following description are some embodiments of the present invention, and for a person skilled in the art, other drawings can also be obtained from these accompanying drawings without creative effort.

DESCRIPTION OF EMBODIMENTS

In order to make the purposes, technical solutions and advantages of the embodiments of the present invention clearer, the technical solutions in the embodiments of the present invention will be clearly and completely described below with reference to the accompanying drawings in the embodiments of the present invention. Obviously, the embodiments to be described are some, but not all, embodiments of the present invention. Based on the embodiments of the present invention, all other embodiments obtained by a person skilled in the art without creative efforts are within the protection scope of the present invention.

Embodiment 1

Figure 1:
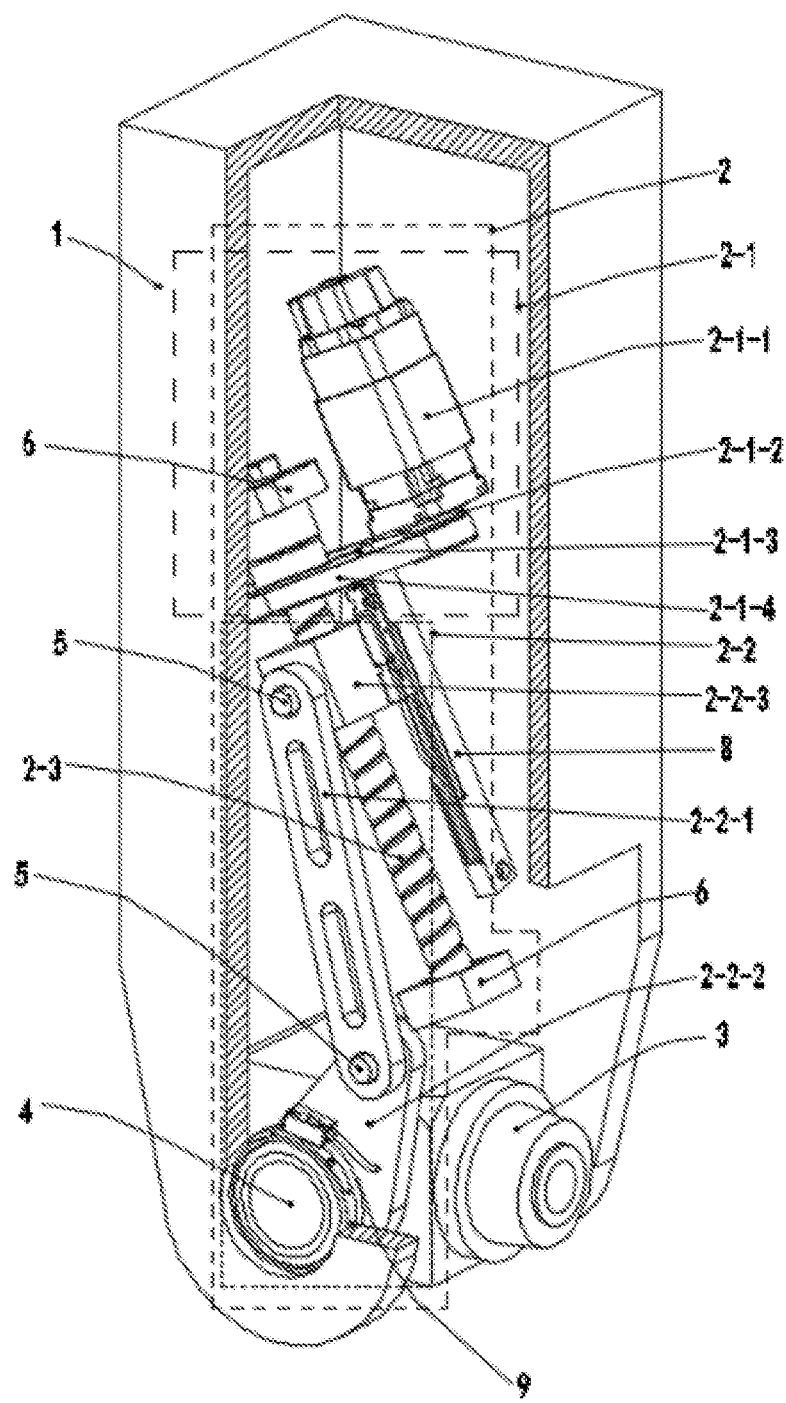
FIG. 1 is an overall schematic diagram of a linkage swing head structure of the present invention.

Specifically, as shown in FIG. 1, which is a schematic diagram of the overall structure of the present invention, the present invention provides a linkage swing head structure, including: a base 1, a drive mechanism 2 and a spindle 3; the drive mechanism 2 includes: a power mechanism 2-1, a connecting rod mechanism 2-2 and a lead screw 2-3.

The base 1 is a rectangular stainless steel casing as a whole, and a support bearing 4 is laterally fixed at a bottom in the base 1. The spindle 3 is an electric spindle, the end thereof is fixed with a cutter 7 for machining parts. The cutter 7 rotates synchronously with the spindle 3. The spindle 3 is fixed on an end of the connecting rod mechanism 2-2. The connecting rod mechanism 2-2 is a linear motion pair. An end of the connecting rod mechanism 2-2 fixed with the spindle 3 is sleeved on the support bearing 4. The connecting rod mechanism 2-2 can rotate around the support bearing 4, thereby driving the spindle 3 to rotate synchronously. The other end of the connecting rod mechanism 2-2 is movably connected to the lead screw 2-3, and the connecting rod mechanism 2-2 adjusts the rotation angle of the spindle 3 by sliding on the lead screw 2-3. The power mechanism 2-1 is fixed on an inner wall of the base 1, and an output end of the power mechanism 2-1 is connected to a top of the lead screw 2-3. The drive mechanism of the present invention is far away from the spindle, and the overall size of the structure is small, and the interference range of the drive mechanism to the spindle is small.

Embodiment 2

Further, in order to better realize the driving effect, the power mechanism 2-1 includes: a servo motor 2-1-1, a driving wheel 2-1-2, a driven wheel 2-1-3 and a synchronous belt 2-1-4.

An output end of the servo motor 2-1-1 is connected to the driving wheel 2-1-2, and the driving wheel 2-1-2 is connected to the driven wheel 2-1-3 via the synchronous belt 2-1-4. The driven wheel 2-1-3 is movably connected to an end of the lead screw 2-3. While the servo motor 2-1-1 drives the driving wheel 2-1-2 to rotate, the driving wheel 2-1-2 drives the synchronous belt 2-1-4 to move, and further, the synchronous belt 2-1-4 drives the driven wheel 2-1-3 to move, and it is achieved that the driven wheel 2-1-3 drives the lead screw 2-3 to rotate.

The connecting rod mechanism 2-2 includes: a first connecting rod 2-2-1, a second connecting rod 2-2-2 and a nut seat 2-2-3. The included angle between the first connecting rod 2-2-1 and the lead screw 2-3 is less than 180°.

The nut seat 2-2-3 is sleeved on the lead screw. The first connecting rod 2-2-1 is a rectangular stainless steel bar, an end of the first connecting rod 2-2-1 is connected to a side wall of the nut seat 2-2-3 via a pin 5, and the other end of the first connecting rod 2-2-1 is movably connected to an end of the approximately tapered second connecting rod 2-2-2 via the pin 5. The other end of the second connecting rod 2-2-2 is fixed on a side wall of the spindle 3, and is rotatably connected to the support bearing 4. When the servo motor 2-1-1 rotates forward, that is, when an end of the lead screw is driven to rotate, the nut seat 2-2-3 drives the first connecting rod 2-2-1 to move downward along the lead screw, and the second connecting rod 2-2-2 rotates clockwise around the support bearing 4 under the thrust of the first connecting rod 2-2-1, thereby driving the spindle 4 and the cutter 7 to rotate clockwise. When the servo motor 2-1-1 rotates backward, the nut seat 2-2-3 drives the first connecting rod 2-2-1 to move upward along the lead screw, and the second connecting rod 2-2-2 rotates counterclockwise around the support bearing 4 under the pulling of the first connecting rod 2-2-1, thereby driving the spindle 4 and the cutter 7 to rotate counterclockwise. The length of the first connecting rod 2-2-1 is twice as long as that of the second connecting rod 2-2-2, so that the servo motor 2-1-1 can output less force to make the first connecting rod 2-2-1 apply a larger pulling force to the spindle 3, and meanwhile make the rotation angle of the spindle 3 larger.

Embodiment 3

Figure 2:
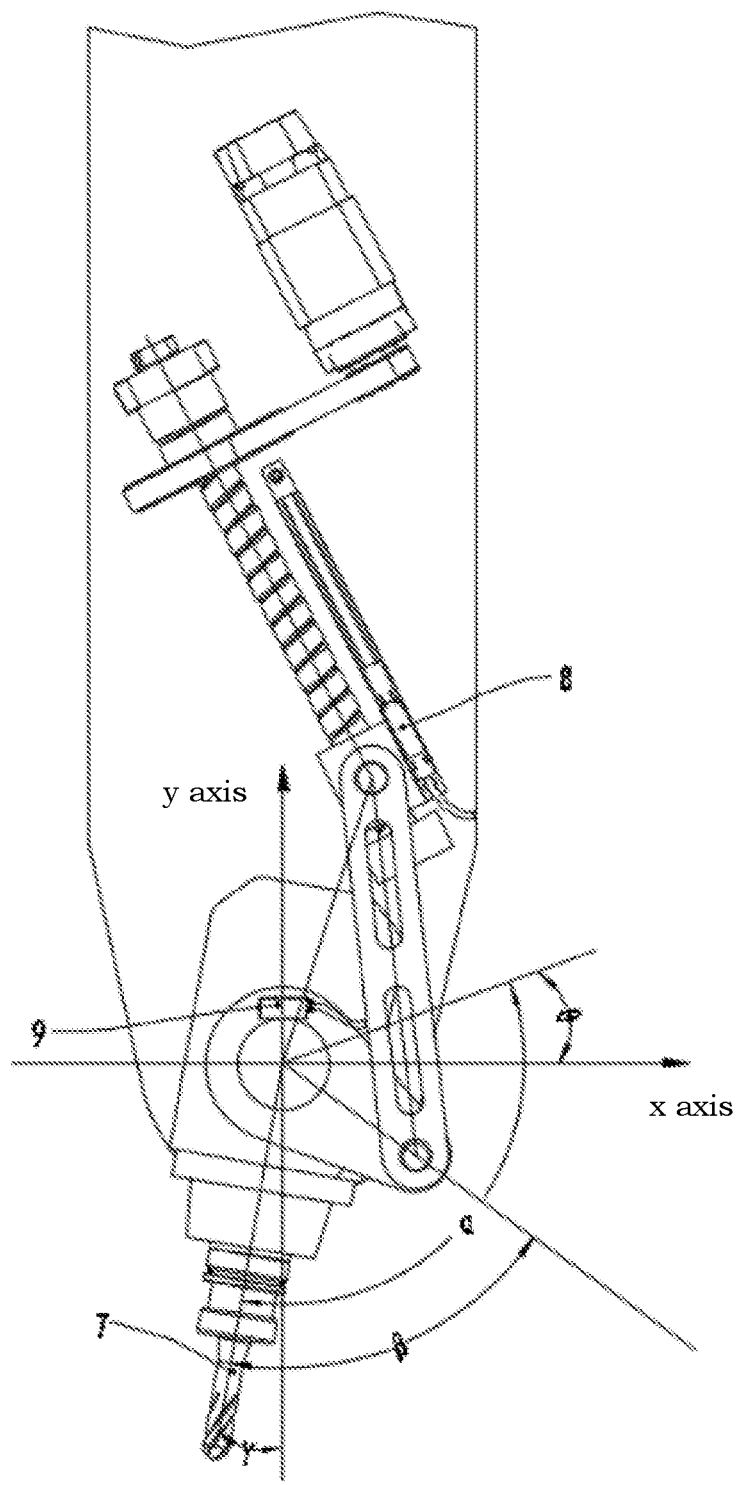
FIG. 2 is an overall schematic diagram when a spindle of the linkage swing head structure of the present invention is rotated to the maximum angle.
Figure 3:
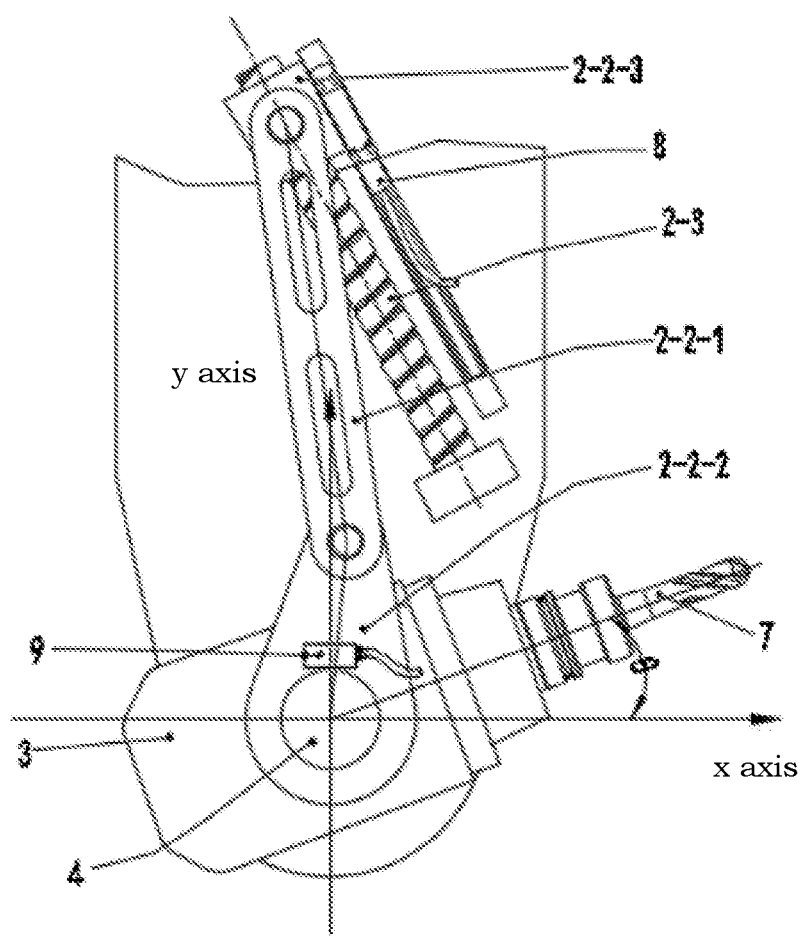
FIG. 3 is an overall schematic diagram when the spindle of the linkage swing head structure of the present invention is at the initial position.

Further, as shown in FIG. 2 and FIG. 3, the included angle $\beta$ between the central axis of the spindle 3 and the central axis of the second connecting rod 2-2-2 ranges from 0° to 180°; the rotation angle $\alpha$ of the spindle 3 ranges from 0° to 120°; and when $\alpha$ is 0°, the included angle between the central axis of the spindle 3 and the x-axis is $\theta$, and when $\alpha$ is 120°, the included angle between the central axis of the spindle 3 and the y-axis is $\gamma$, and the sum of $\theta$ and $\gamma$ is 30°.

In this embodiment, when $\theta$ is 20°, it is the initial position of the spindle, where the machining of the bottom of the part can be performed. Under this premise, after the spindle is rotated to the maximum angle, the included angle between the spindle and the y-axis is 10°, and the machining of the top or side of the part can be performed. The cutter 7 can machine the part in all directions from multiple angles, and meanwhile, the spindle 3 can machine the part using the cutter 7 without rotating by the same angle as the second connecting rod 2-2-2 does.

Embodiment 4

Further, in order to prevent the nut seat 2-2-3 from disengaging from two ends of the lead screw 2-3, the lead screw 2-3 is provided with an anti-dropping piece 6 at an end outside the driving wheel 2-1-2 and at an end outside the nut seat 2-2-3.

Embodiment 5

Further, the linkage swing head structure includes a linear measurement unit 8 and an angle measurement unit 9.

The linear measurement unit 8 is fixed on the nut seat 2-2-3, and the angle measurement unit 9 is fixed on a side wall at an end portion of the support bearing 4.

Specifically, the linear measurement unit 8 is a grating ruler fixed on the nut seat 2-2-3. The grating ruler includes a linear grating ruler and a reading head. The grating ruler moves with the nut seat 2-2-3 to detect the travel of the nut seat 2-2-3 on the lead screw 2-3 (the working principle of the grating ruler is a prior art and will not be repeated in this application). The angle measurement unit 9 is specifically a circular grating with small size and high precision. The circular grating includes a circular grating ruler and a reading head. The circular grating is used to detect the rotation angle $\beta$ of the spindle 3 to ensure that the cutter 7 is rotated in place (the working principle of the circular grating is a prior art and will not be repeated in this application).

Embodiment 6

In this embodiment, two side walls of the base 1 parallel to the rotation axis of the spindle 3 are provided with openings for rotating the spindle 3. An opening prevents the spindle 3 from interfering with the base 1 during rotation; the function of the other opening is to prevent the tail of the spindle from interfering with the base when the spindle is too large.

Embodiment 7

Figure 4:
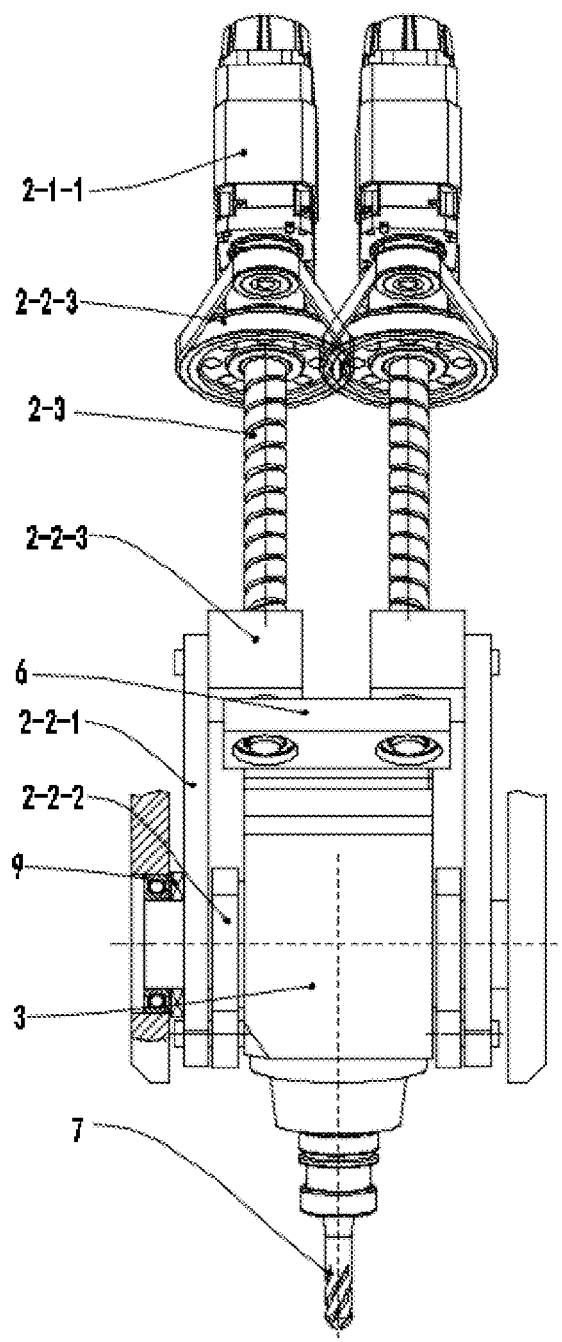
FIG. 4 is a schematic diagram of a linkage swing head structure of the present invention having two sets of drive mechanisms.

Further, as shown in FIG. 4, in this embodiment, the drive mechanism 2 consists of two groups, which are respectively arranged on the two side walls of the spindle 3 and can realize high-precision measurement and improve the stability of drive.

Finally, it should be noted that the above embodiments are only used to illustrate the technical solutions of the present invention, but not to limit them. Although the present invention has been described in detail with reference to the foregoing embodiments, a person skilled in the art should understand that the technical solutions described in the foregoing embodiments can still be modified, or some or all of the technical features thereof can be equivalently substituted. However, these modifications or substitutions do not make the essence of the corresponding technical solutions deviate from the scope of the technical solutions of the embodiments of the present invention.

The invention claimed is:

1. A linkage swing head structure, comprising:
   a base, which is a casing;
   a spindle for fixing a cutter; and
   a drive mechanism, which includes: a lead screw, a connecting rod mechanism, and a power mechanism for driving oscillation of the spindle, wherein
   the connecting rod mechanism, includes: a first connecting rod; a second connecting rod; and a nut seat;
   the nut seat is sleeved on the lead screw; an end of the first connecting rod is fixedly connected to a side wall of the nut seat via a first pin, an opposing end of the first connecting rod is movably connected to an end of the second connecting rod via a second pin, and an opposing end of the second connecting rod is fixed on a side wall of the spindle and is rotatably connected to a support bearing fixed in the base;
   an end of the power mechanism is fixed on an inner wall of the base, and an output end of the power mechanism is connected to an end of the lead screw;
   a length of the first connecting rod is twice a length of the second connecting rod; and
   with respect to a vertical direction, a central longitudinal axis of the lead screw is disposed, from top to bottom, in an oblique orientation within the base.

2. The linkage swing head structure according to claim 1, wherein:
   the power mechanism includes: a servo motor, a driving wheel, a driven wheel, and a synchronous belt;
   an output end of the servo motor is connected to the driving wheel and the driving wheel is connected to the driven wheel via the synchronous belt; and
   the driven wheel is movably connected to the end of the lead screw.

3. The linkage swing head structure according to claim 2, wherein:
   the lead screw is provided with a first anti-dropping piece at the end thereof, and the lead screw is further provided a second anti-dropping piece at an opposing end thereof.

4. The linkage swing head structure according to claim 1, wherein:
   an included angle $\beta$ between a central longitudinal axis of the spindle and a central longitudinal axis of the second connecting rod ranges from 0° to 180°;
   a rotation angle $\alpha$ of the spindle ranges from 0° to 120°;
   when the rotation angle $\alpha$ of the spindle is 0°, an included angle between the central longitudinal axis of the spindle and an x-axis is $\Theta$, and
   when the rotation angle $\alpha$ of the spindle is 120°, an included angle between the central longitudinal axis of the spindle and a y-axis is $\gamma$, and the sum of $\Theta$ and $\gamma$ is 30°,
   where the y-axis denotes a direction extending parallel to a central longitudinal axis of the base, and the x-axis denotes a direction extending perpendicular to the y-axis.

5. The linkage swing head structure according to claim 1, further comprising:
   a linear measurement unit for detecting a linear travel distance of the nut seat; and
   an angle measurement unit for detecting a rotational angle of the second connecting rod,
   wherein the linear measurement unit is fixed on the nut seat, and the angle measurement unit is fixed on a side wall of the support bearing.

6. The linkage swing head structure according to claim 1, wherein:
   an opening for rotating the spindle is provided on a side wall of the base parallel to a rotation axis of the spindle.

7. The linkage swing head structure according to claim 1, wherein;
   the linkage swing head structure further comprises a second drive mechanism, wherein the drive mechanism and the second drive mechanism are symmetrically arranged about opposing side walls of the spindle.

* * * * *